United States Patent [19]

Windle

[11] 4,308,771
[45] Jan. 5, 1982

[54] TOOL HOLDER FOR CHUCKER LATHE

[76] Inventor: William K. Windle, 842 E St., Olivenhaim, Calif. 92024

[21] Appl. No.: 130,069

[22] Filed: Mar. 13, 1980

[51] Int. Cl.³ ............................................. B23B 29/26
[52] U.S. Cl. ........................................ 82/36 R; 29/52
[58] Field of Search ................. 82/36 R, 36 A, 36 B, 82/37, 2 R; 29/41, 42, 52, 54, 57

[56] References Cited

U.S. PATENT DOCUMENTS

| | | | |
|---|---|---|---|
| 556,415 | 3/1896 | Hartness | 82/36 A |
| 1,230,974 | 6/1917 | Abbott | 29/57 |
| 2,148,348 | 2/1939 | Groene et al. | 29/42 |
| 3,459,076 | 8/1969 | Kummer | 29/54 |
| 3,750,245 | 8/1973 | Kennedy et al. | 82/36 A |

FOREIGN PATENT DOCUMENTS

| | | | |
|---|---|---|---|
| 1946467 | 9/1969 | Fed. Rep. of Germany | 82/36 R |
| 2443014 | 9/1974 | Fed. Rep. of Germany | 82/36 B |
| 2637792 | 2/1978 | Fed. Rep. of Germany | 82/36 R |

Primary Examiner—Leonidas Vlachos
Attorney, Agent, or Firm—Brown & Martin

[57] ABSTRACT

A tool holder which holds a plurality of tools is mounted on at least one station of the tool turret on a chucker lathe. The fact that a plurality of tools is mounted at one tool station enables a plurality of machining operation to be performed on a work piece without rotating the tool turret and thus provides a substantial saving in machining time. It also provides increased accuracy due to elimination of indexing errors, and also saves setup time because the tools can stay in the tool holder when it is removed from the tool turret to be used on future jobs.

3 Claims, 4 Drawing Figures

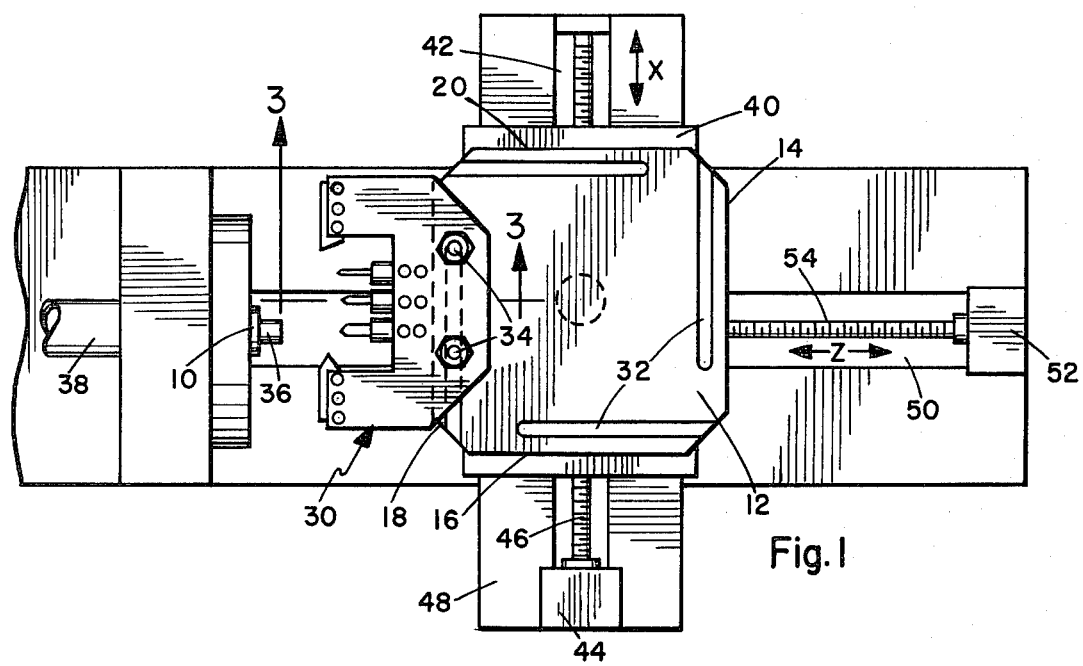
Fig. 1
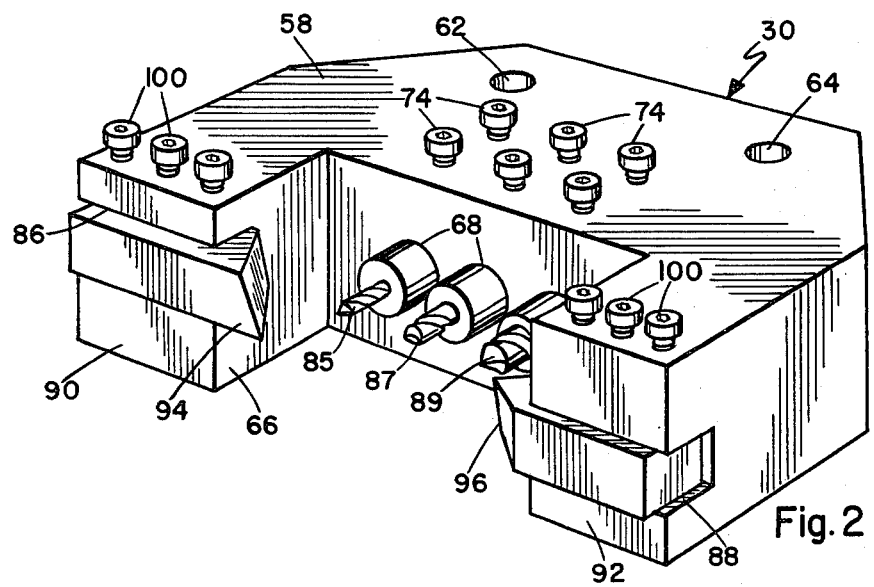
Fig. 2
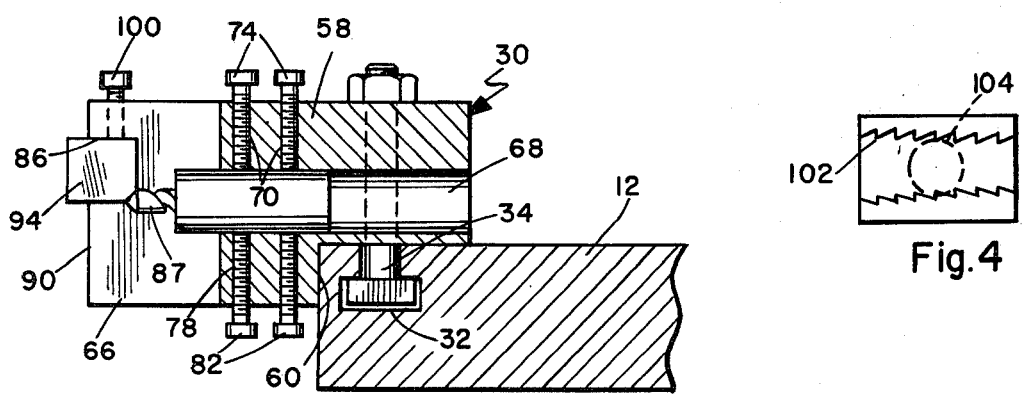
Fig. 3
Fig. 4

TOOL HOLDER FOR CHUCKER LATHE

BACKGROUND OF THE INVENTION

This invention relates to tool holders for chucker lathes. Chucker lathes have a tool turret on which a plurality of individual tools can be mounted around the periphery of the tool turret. Each tool is mounted in corresponding tool holder at a corresponding tool holder station, and the tool turret can be rotated to bring any desired tool into operative position to perform a machining operation on a work piece which is held in the lathe's chuck. The turret can also be moved linearly along perpendicular x and z axis to move the tool into the work piece, which is rotating, to make a cut or drill a hole. After a machining operation is performed with one tool, the turret is moved far enough away from the work piece to be rotated, then it is rotated to bring the tool for the next machining operation into operative position. The turret is then moved toward the work piece to perform the next machining operation. This process of rotating the tool turret from tool to tool is repeated until all the machining operations are completed.

The cost of parts which are machined on chucker lathes depends largely on the set up time and the length of time it takes to machine the parts. The principal object of this invention is to provide means for reducing the amount of set up time and machining time required to machine a given part on a chucker lathe.

Another object of this invention is to provide means for increasing the accuracy of parts machined on chucker lathes.

Other objects and advantages of the invention will be apparent from the detailed description herein.

SUMMARY OF THE INVENTION

A tool holder which is adapted to hold a plurality of tools in operative positions to perform machining operations on a common work piece is dimensioned to be mounted on one tool holder station of a tool turret in a chucker lathe or the like. The fact that there are a plurality of tools on one tool station shortens the machining time and increases accuracy due to elimination of indexing errors. It also saves set up time in cases where the job is to be repeated since the tools can stay in the tool holder when it is removed from the tool turret. Machine time can be saved by presetting the tool holder while the machine is working another job. The inventor has experimentally operated a chucker lathe utilizing the invention for more than a year and has found that it reduces the cycle time for producing parts from 10% to 50%, depending on the operations to be performed, over production with individual tool holders.

BRIEF DESCRIPTION OF THE DRAWINGS

FIG. 1 is a plan view of a chucker lathe utilizing the preferred embodiment of the invention.

FIG. 2 is a perspective view of the preferred embodiment of the invention.

FIG. 3 is an enlarged sectional view taken on the line 3—3 of FIG. 1.

FIG. 4 is a plan view of a broach which is adapted for use in the tool holder of FIGS. 2 and 3.

DESCRIPTION OF THE PREFERRED EMBODIMENT

FIG. 1 is a plan view showing the preferred embodiment of the invention mounted on a conventional chucker lathe. The chucker lathe includes a chuck 10, conventional means (not shown) for rotating chuck 10, and a tool turret 12 which is rotatable about a vertical axis and is linearly moveable along a perpendicular horizontal x and z axis. Tool turret 12 has 8 different tool stations 14 through 20 and is shown having a tool holder 30 mounted on tool station 18. Each tool station has a T-slot 32 (see FIG. 3) for receiving T-bolt clamps 34 which are used to clamp tool holder 30 onto the tool turret 12. The tool turret 12 can be rotated to bring any one of the tool stations 14 through 20 into operative position relative to a work piece 36 in chuck 10. The work piece 36 in this example is the end of a metal rod which is automatically fed into chuck 10 through a feed tube 38. The tool turret 12 is rotatably mounted on a base 40 which is slideably mounted on X-axis way 42. A motor 44 rotates a lead screw 46 which moves base 40 along X-axis way 42. X-axis way 42 is formed on a saddle 48 which is slideably mounted on a Z-axis way 50. A motor 52 rotates a lead screw 54 which moves saddle 48 along Z-axis way 50. The operation of motors 44 and 52 is controlled by conventional numerical control circuits (not shown) to provide any desired combination of movement for tool turret 12 along the X and Y axis, the structure and operation being well known.

FIGS. 2 and 3 show the details of the preferred embodiment of the invention. The tool holder 30 consists of a block of metal 58 which has a rear recess 60 (FIG. 3) for fitting over the edge of the tool turret 12 above the T-slot 32. Two vertical bores 62 and 64 (FIG. 1) are formed in block 58 to accommodate two T-bolts 34 for clamping the tool holder 30 to the tool turret 12. The corners of block 58 around bores 62 and 64 are cut at a 45° angle, to eliminate interference with other tool holders chucked at adjacent stations on the tool turret 12.

A second recess 66 is formed in the front of block 58 and three horizontal bores 68 (FIG. 3) for holding end cutting tools are formed in the bottom of recess 66. Two vertical threaded openings 70 for holding set screws 74 communicate into the top of each bore 68 and two vertical threaded openings 78 for holding set screws 82 communicate into the bottom of each bore 68. As shown in FIG. 2, any suitable tools 85, 87 and 89, such as drills, reamers, counter sinks, etc., can be seated in the bores 68.

Third and fourth recesses 86 and 88 (FIG. 2) are formed in the ends 90 and 92 respectively of block 58 to hold tool bits 94 and 96 respectively. Set screws 100 hold tool bits 94 and 96 in place.

To use the tool holder of this invention, the individual tools 85, 87, 89, 94, and 96 are first mounted in tool holder 30, which is then clamped to the tool station 24. Tool turret 12 is then rotated to bring tool station 24 into operative relation with work piece 36 as shown in FIG. 1. The individual tools 85, 87, 89, 94 and 96 are then adjusted for the work that is to be performed on the work piece 36. Next, the desired program of X and Z movements is programmed into the numerical control circuits. Finally, the required X and Z are performed to bring one tool after another into cutting relationship with work piece 36. No rotation of tool turret 12 is required during this machining operation. This eliminates indexing errors in addition to substantially reducing machining time. If the job is to be done again in the future, the tools 85, 87, 89, 94, and 96 are left on tool holder 30 to save time on future setups. This can result in a savings of several hours of setup time.

The tool holder of this invention is not restricted to turning operations. A broach 102 which is mounted on a shaft 104 which fits in bore 68 can be used with a stationary chuck to cut flats on work piece 36. The configuration of the tool holder may vary to suit the number and nature of tools to be used in a particular group.

I claim:

1. A tool holder for use in combination with a chucker lathe which includes a tool turret having a plurality of tool holder stations thereon, said tool holder comprising:

a tool holder block;

means on said tool holder block for attaching said tool holder block to one tool station of said tool turret;

means on said tool holder block for holding a plurality of tools in operative position to perform different machining operations on a common workpiece, and a plurality of horizontal bores extending entirely through said tool holder block and comprising means for holding cutting tools;

and a plurality of horizontal recesses in said tool holder block for holding cutting tool bits; and said means for attaching said tool holder block to said tool turret comprising a generally L-shaped recess forming an abutting face for positioning said tool holder block on and engaging said tool turret.

2. The tool holder defined in claim 1, wherein:

said means for attaching said tool holder block to said tool turret further includes a plurality of vertical bores for receiving T bolt clamps.

3. The tool holder defined in claim 1 and also including threaded openings communicating in said bores and into said recesses for holding set screws to clamp said tools into said bores and recesses.

* * * * *